United States Patent
Ham (10) Patent No.: US 7,918,431 B2
(45) Date of Patent: Apr. 5, 2011

(54) LEVITATION TYPE SUPPORT UNIT

(75) Inventor: DuckChun Ham, Gyeonggi-do (KR)

(73) Assignee: Yeil M & C Co., Ltd., Gyeonngi-Do (KR)

( * ) Notice: Subject to any disclaimer, the term of this patent is extended or adjusted under 35 U.S.C. 154(b) by 457 days.

(21) Appl. No.: 12/038,744

(22) Filed: Feb. 27, 2008

(65) Prior Publication Data

US 2009/0173861 A1    Jul. 9, 2009

(30) Foreign Application Priority Data

Jan. 9, 2008    (KR) ........................ 10-2008-0002501

(51) Int. Cl.
*F16F 15/03* (2006.01)
*F16M 13/00* (2006.01)

(52) U.S. Cl. ..................... 248/560; 248/188.2; 248/618; 188/267

(58) Field of Classification Search ............... 248/188.2, 248/562, 563, 560, 618, 621; 188/267
See application file for complete search history.

(56) References Cited

U.S. PATENT DOCUMENTS

| | | | | |
|---|---|---|---|---|
| 4,314,623 | A | * | 2/1982 | Kurokawa ..................... 188/267 |
| 4,432,441 | A | * | 2/1984 | Kurokawa ..................... 188/267 |
| 2003/0155823 | A1 | | 8/2003 | Willner |

FOREIGN PATENT DOCUMENTS

| | | |
|---|---|---|
| CN | 2469241 Y | 1/2002 |
| DE | 20 2006 009 361 U1 | 9/2006 |
| JP | 2001-165239 A | 6/2001 |
| JP | 2007-46287 A | 2/2007 |
| KR | 10-2006-0113126 A | 11/2006 |

* cited by examiner

*Primary Examiner* — Anita M King (74) *Attorney, Agent, or Firm* — Roberts Mlotkowski Safran & Cole P.C.

(57) ABSTRACT

A levitation type supporting unit interposed between an object and an installing surface for supporting the object respective to the installing surface. The supporting unit includes lower and upper magnet parts having a lower magnet; the upper magnet part arranged at an upper part of the lower magnet part while having an interval spaced from the lower magnet part, the upper magnet part having a surface facing a surface of the lower magnet, the surfaces having equal polarities; an upper fixing cap being assembled with the upper magnet part to allow elevation; a lower fixing cap connected with the upper fixing cap and is assembled with the lower magnet part; and a fixing part including a connecting part formed on one side, connecting the upper and lower fixing caps while having an interval forming an exposed space between the upper and lower fixing caps, the fixing part preventing the upper magnet part from escaping from an upper position of the lower magnet part.

16 Claims, 13 Drawing Sheets

Fig. 13

LEVITATION TYPE SUPPORT UNIT

BACKGROUND OF THE INVENTION

1. Field of the invention

The present invention relates to a levitation type support unit, and more particularly to a levitation type support unit interposed with an object to be supported and an installing surface by using a repulsive force between magnets so as to support the object with respect to the installing surface.

2. Description of the Prior Art

When articles (hereinafter, collectively referred to as "objects to be supported"), such as speakers, automatic washers, or sporting equipment, are used, vibrations are generated within the objects to be supported, themselves. Such frequency of vibration approaches an audio frequency band, thereby generating noises.

Particularly, a type of dwelling in a house such as an apartment has been recently generalized so that a problem of noises generated between floors becomes serious.

In order to decrease such vibrations of the object to be supported and noises caused by the vibrations, an elastic body such as a ballast mat, etc. is typically disposed at a lower part of the object to be supported so as to absorb vibrations generating in the object to be supported.

However, the conventional supporting structure of a supported object can be worn away or be damaged, and particularly, vibrations of the supported object are transferred while making direct contact with the supporting structure of the supported object so that the vibration cannot be effectively absorbed. Therefore, vibration and noises between floors of residential space such as an apartment cannot be effectively reduced.

Meanwhile, although there is a supporting means having a simple structure where a pair of magnets is inserted in one casing in such a manner that the same kind of poles thereof face each other so that a repulsive force between the magnets can be used so as to support an object, the supporting means can loose parts, and has to have a protruding structure, which can be inserted into the casing, formed at a lower surface of the object to be supported, thereby decreasing effectiveness. Therefore, this kind of supporting means is not used any more at present.

Also, a state of magnets being spaced apart from each other is covered by an upper casing and a lower casing. Therefore, a state where the magnets are supported by the levitation method can not be identified by the naked eye.

SUMMARY OF THE INVENTION

Accordingly, the present invention has been made to solve the above-mentioned problems occurring in the prior art, and the present invention provides a supporting unit which can support various kinds of objects by a levitation method.

Also, the present invention provides a levitation type supporting unit which can endure fatigue load, etc. even though a use period increases.

Also, the present invention provides a levitation type supporting unit which can minimize vibration and noises between floors in residential space such as an apartment.

Also, the present invention provides supporting unit which can be easily disassembled so as to be replaced when there is a need to replace components including a magnet.

Also, the present invention provides a supporting unit allows an observer to directly identify a state of an object being supported by a levitation method by means of naked eyes.

Also, the present invention provides a supporting unit having a comparatively simple structure allowing a magnet to be installed so that manufacturing cost can be reduced.

Furthermore, the present invention provides a supporting unit which doesn't have any concern in losing components.

In accordance with an aspect of the present invention, there is provided a levitation type supporting unit interposed between an object to be supported and an installing surface so as to support the object respective to the installing surface, which includes: a lower magnet part having a lower magnet; an upper magnet part having an upper magnet, arranged at an upper part of the lower magnet part while having an interval in such a manner that the upper magnet part is spaced from the lower magnet part, the upper magnet has a surface facing the lower magnet, a polarity of the surface being equal to a polarity of a corresponding surface of the lower magnet; and a fixing part which includes an upper fixing cap being assembled with the upper magnet part so as to allow the upper magnet part to ascend and descend, a lower fixing cap which is spaced from the upper fixing cap and is assembled with the lower magnet part, and a connecting part formed between the upper fixing cap and the lower fixing cap, the connecting part connecting the upper fixing cap and the lower fixing cap in such a manner that a space formed between the lower magnet part and the upper magnet part is exposed, the fixing part preventing the upper magnet part from escaping from an upper position of the lower magnet part.

The upper fixing cap includes: an upper receiving part receiving the upper casing, the upper receiving part having an opened upper side; a locking jaw being included at an upper part of the upper receiving part so as to prevent the upper magnet part from escaping toward an upper direction; and outer peripheral protuberances formed at an outer circumferential surface of the upper casing, the outer peripheral protuberances being locked with the locking jaw.

It is preferable that the outer periphery protuberances may be arranged while radially protruding, and each surface of outer periphery protuberances, which makes contact with an inner surface of the upper receiving part, has undergone a rounding process.

It is preferable that a buffer ring made from elastic material may be installed between the outer periphery protuberances and the locking jaw.

It is preferable that an inner surface of the lower casing may have a radially protruding shape.

The levitation type supporting unit further includes a sub-support having one side having a shape corresponding to a shape of each spike so as to allow the corresponding spike to be assembled, and another end assembled with an upper portion of the upper magnet part when the object to be supported has a plurality of spikes for preventing vibrations formed at a lower part of the object to be supported.

It is preferable that a ring having a sectional circle-shape or a protuberance having a shape of a semi-circle may be installed along an outer circumferential surface of the upper magnet part.

The fixing part, the lower magnet part and the upper magnet part are reversed in up and down directions so that the upper magnet part assembled with the upper fixing cap is installed at the installing surface in such a manner that the upper magnet part makes contact with the installing surface.

The levitation type supporting unit may be integrally installed at a lower part of the object to be supported in state of upright or reverse.

According to the present invention, various kinds of objects can be supported by a levitation type supporting unit, and the objects can endure fatigue load, etc. even through the period of the supporting unit being used increases.

Particularly, the supporting unit supports an object according to levitation method so that vibration and noises generated between floors of residential space, such as an apartment, can be minimized, and it is easy to replace parts such as magnets.

Also, a state of an object supported by levitation method can be identified by the naked eye, the supporting structure is not complicated, and components of the supporting unit, such as a magnet, etc., can be prevented from being lost.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE EXEMPLARY EMBODIMENTS

Hereinafter, exemplary embodiments of the present invention will be described with reference to the accompanying drawings.

Figure 1:
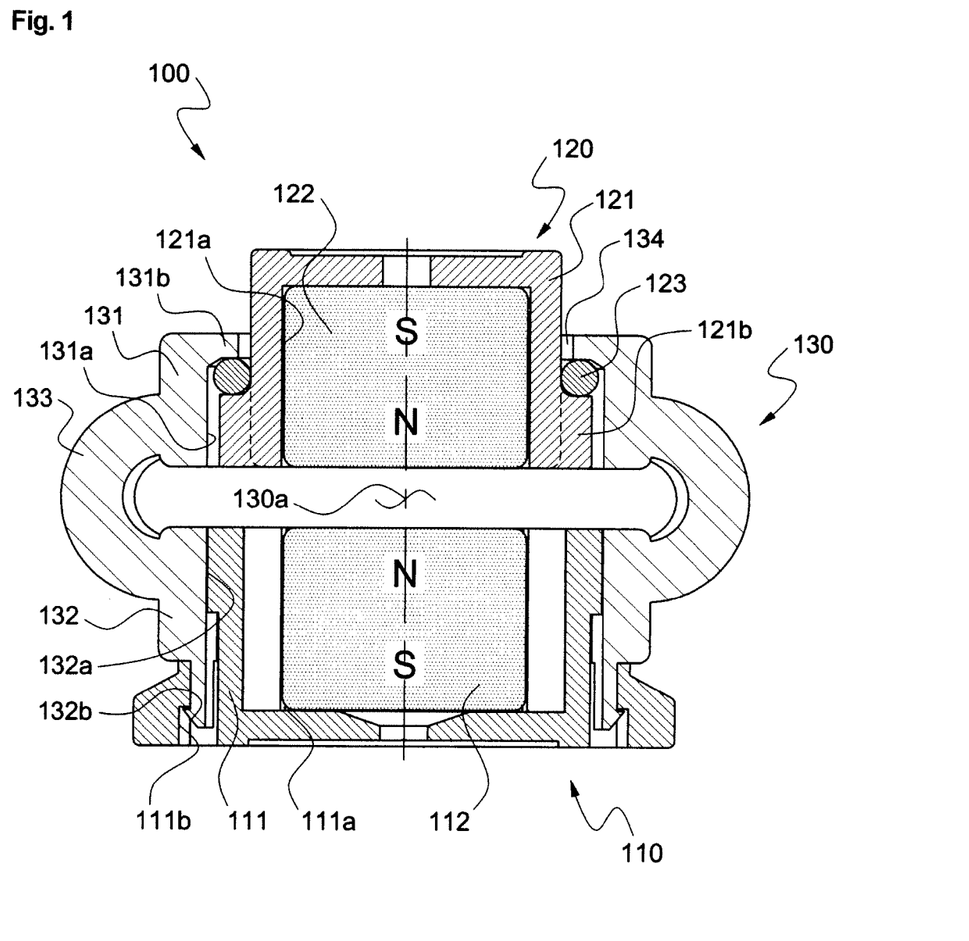
FIG. 1 is a sectional view of a supporting unit according to an embodiment of the present invention.
Figure 2:
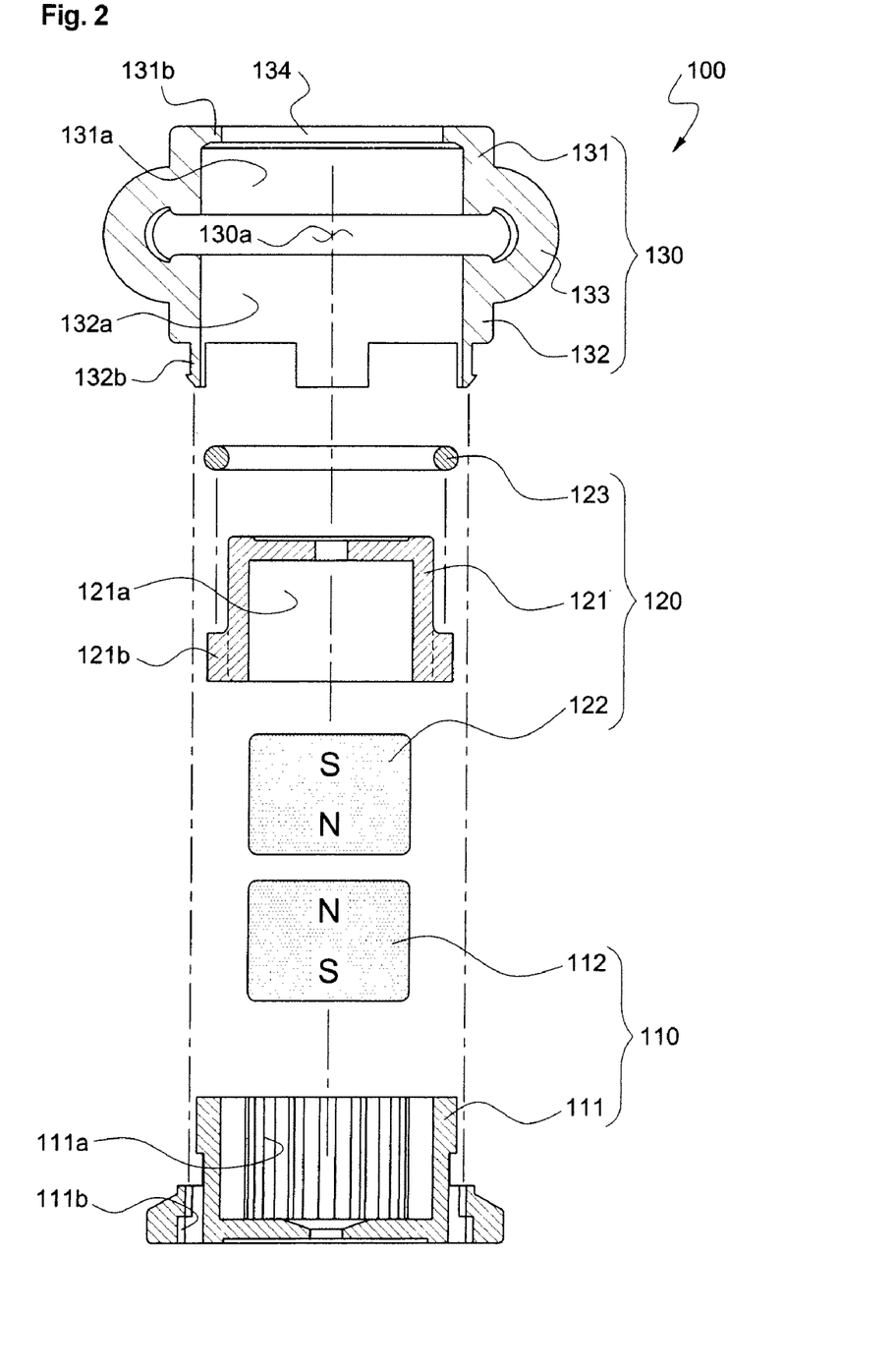
FIG. 2 is an exploded sectional view of the supporting unit shown in FIG. 1.

As shown in FIGS. 1 and 2, a supporting unit 100 using a levitation method according to an embodiment of the present invention includes a lower magnet part 110, an upper magnet part 120, and a fixing part 130.

Figure 6:
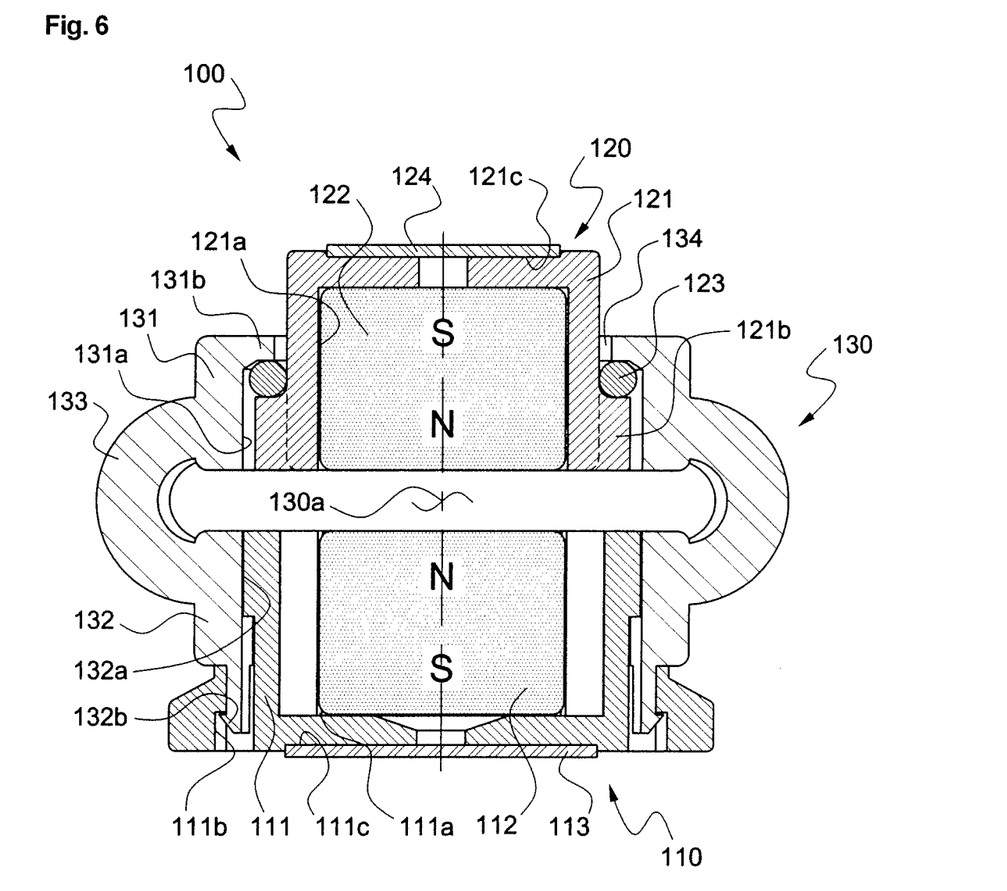
FIG. 6 is a sectional view of a supporting unit according to another embodiment of the present invention.
Figure 7:
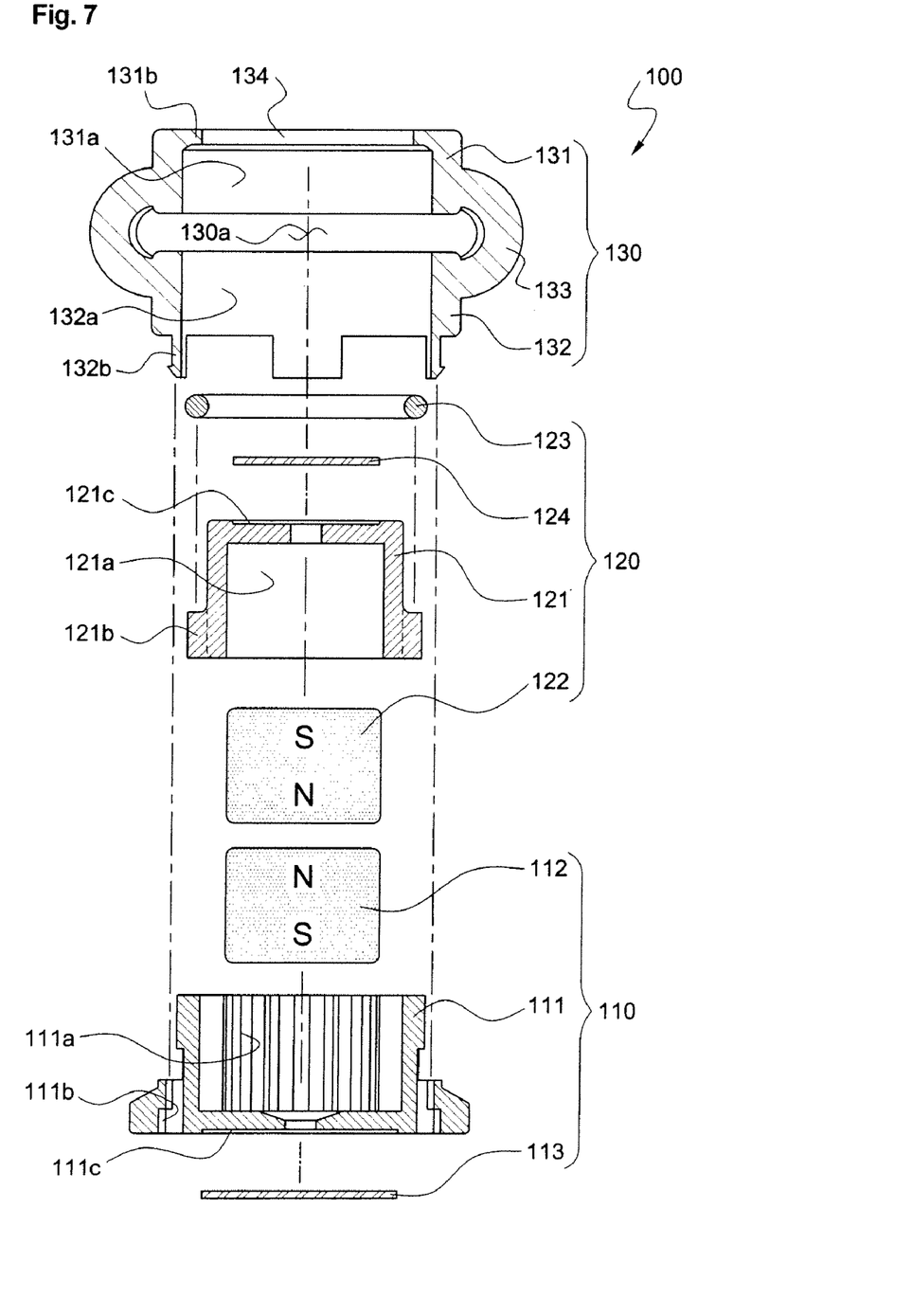
FIG. 7 is an exploded sectional view of the supporting unit shown in FIG. 6.

As shown in FIG. 2, the lower magnet part 110 includes a lower casing 111 and a lower magnet 112. As shown in FIGS. 6 and 7, which illustrate another embodiment of the present invention, the lower magnet part 110 can further include a lower packing 113 assembled with a lower part of the lower casing 111. Accordingly, a contacting force between a lower surface of the supporting unit 100 and an installing surface thereof can increase due to the lower packing 113.

Figure 4:
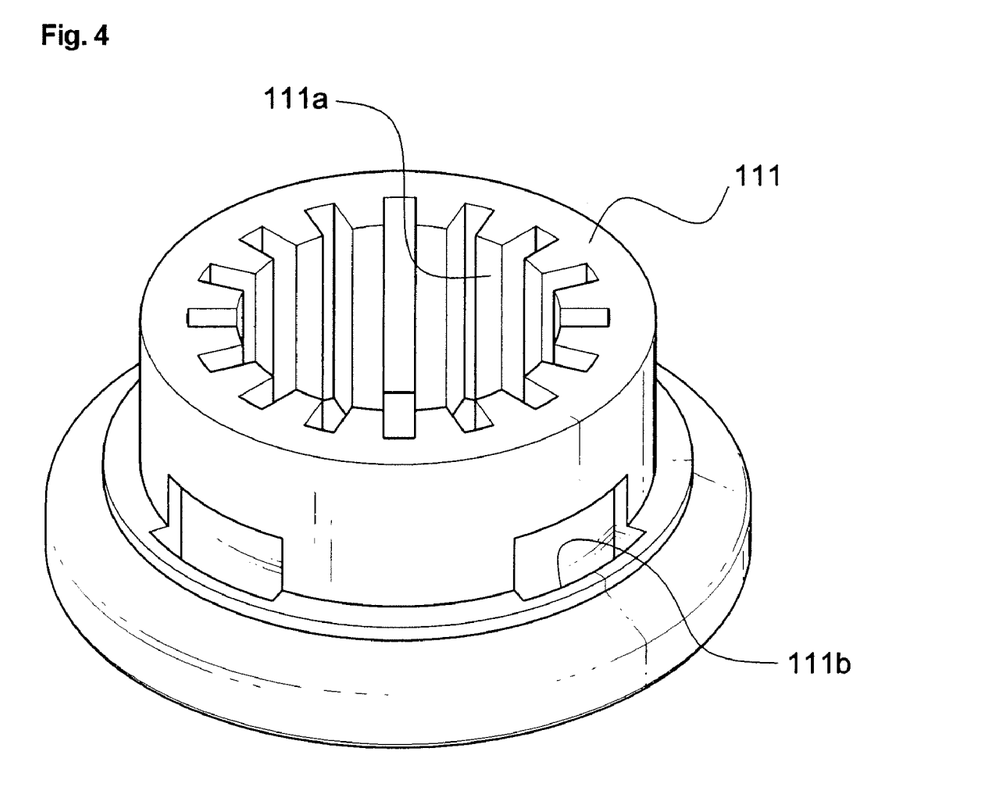
FIG. 4 is a perspective view of a lower casing shown in FIG. 2.

As shown in FIG. 2, the lower casing 111 includes a lower magnet receiving space 111a for receiving the lower magnet 112 and an engaging part 111b with which a locking part 132b of a lower fixing cap 132, which will be described below, are engaged. According to an embodiment of the present invention, as shown in FIG. 4, it is preferable that an inner surface of the lower magnet receiving space 111a has a radial protruding shape in a plan view. Therefore, the amount of material consumption in manufacturing the lower casing 111 is reduced so that manufacturing cost can be reduced.

According to another embodiment of the present invention, as shown in FIG. 7, the lower casing 111 can further include a lower packing receiving part 111c formed at a lower part thereof so as to allow the lower packing 113 to be assembled therewith.

As shown in FIG. 2, the upper magnet part 120 is disposed at an upper part of the lower magnet part 110, and includes an upper casing 121, an upper magnet 122, and a buffer ring 123. According to another embodiment of the present invention, as shown in FIGS. 6 and 7, the upper magnet part 120 may further include an upper packing 124 assembled with an upper part of the upper casing 121. Accordingly, a contact force between an upper surface of the supporting unit 100 and a lower surface of a supported object 200 can increase due to the upper packing 124. Particularly, the lower packing 113 and the upper packing 124 prevent the supported object 200 and a contact surface of the supporting unit 100, which makes contact with an installing surface, from sliding, respectively. Therefore, falling down of the supporting unit 100 or the supported object 200 can be prevented.

Figure 3:
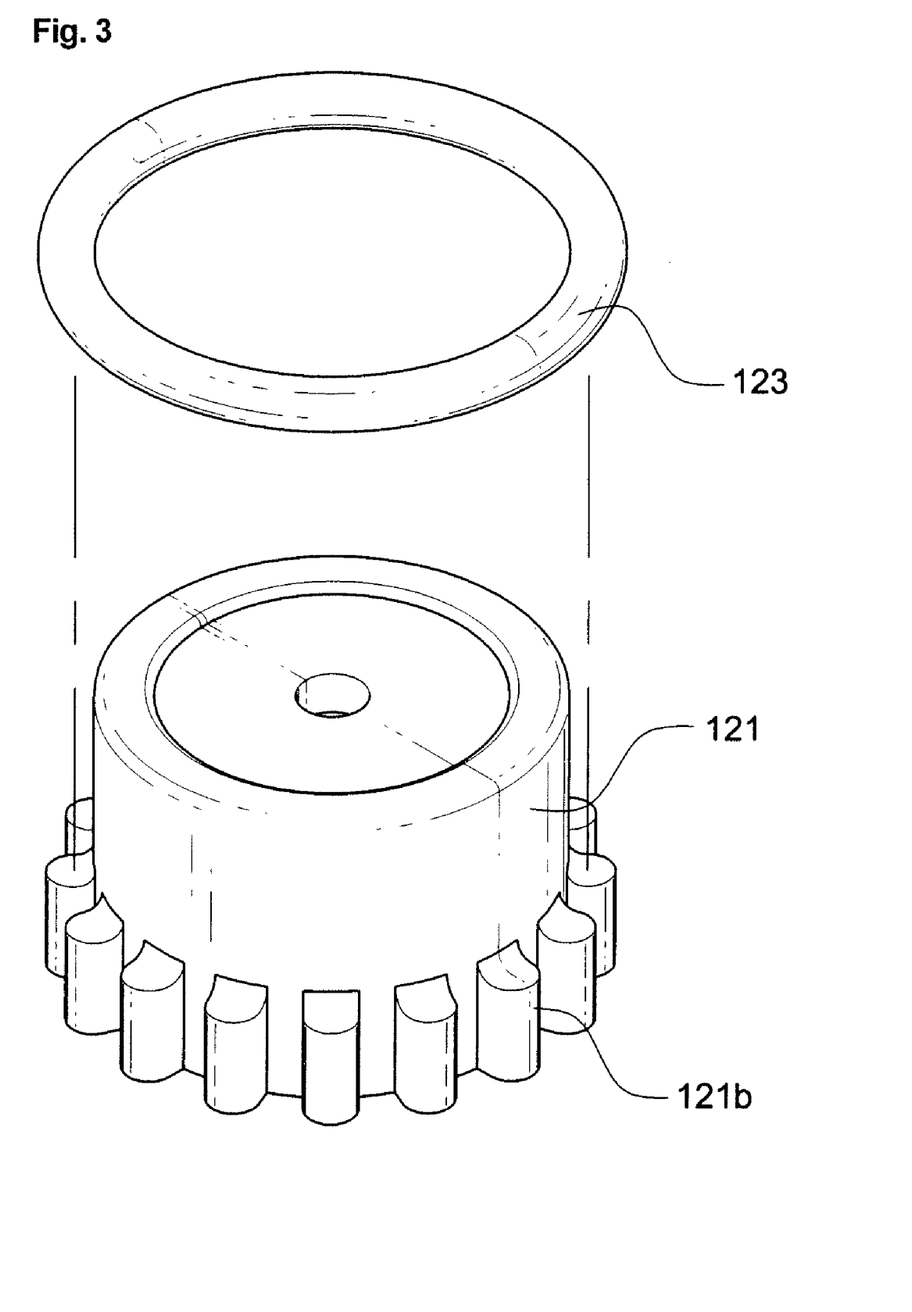
FIG. 3 is a perspective view of a buffer ring and an upper casing shown in FIG. 2.

As shown in FIG. 2, the upper casing 121 includes an upper magnet receiving space 121a for receiving an upper magnet 122 and outer peripheral protuberances 121b which are arranged at an outer circumferential surface thereof and radially protrude in a plan view (see FIG. 3).

According to another embodiment of the present invention, as shown in FIG. 7, the upper casing 121 may further include an upper packing receiving part 121c formed at an upper part thereof so as to allow the upper packing to be assembled therewith.

As shown in FIGS. 2 and 3, the buffer ring 123 is assembled with each upper part of the outer peripheral protuberances 121b and is made from elastic material so that the buffer ring 123 absorbs impacts when the upper magnet part 120 makes contact with a locking jaw 131b of an upper fixing cap 131, which will be described.

According to an embodiment of the present invention, the buffer ring 123 is assembled with each upper part of the outer peripheral protuberances 121b of the upper casing 121. Meanwhile, according to another embodiment of the present invention, the buffer ring 123 may also be assembled with an inner surface of the locking jaw 131b of the upper fixing cap 131.

Accordingly, abrasions caused by direct contact between the locking jaw 131b and the outer peripheral protuberances 121b can be prevented.

According to an embodiment of the present invention, it is preferable that the lower packing 113, the upper packing 124, and the buffer ring 123 are made from material including sufficiently elastic material, such as rubber and urethane.

As shown in FIGS. 1 and 2, the upper magnet 122 is arranged in such a manner that polarity of a surface of the upper magnet 122, which faces the lower magnet 112, is equal to polarity of a surface of the lower magnet 112, which faces the upper magnet 122, and is received in the upper magnet receiving space 121a. Accordingly, repulsive force is applied between the lower magnet 112 and the upper magnet 122 so that the object 200 can be supported by a levitation method.

Meanwhile, the installing structure of a magnet generating repulsion is simply achieved by the lower magnet 112 and the upper magnet 122. Therefore, manufacturing cost of the supporting unit 100 can be reduced.

Therefore, vibrations of the supported object 200 are transmitted through space formed between the upper magnet 122 and the lower magnet 112. Therefore, vibrations and noises between floors in residential space, such as an apartment, can be minimized.

Also, the upper magnet part 120 does not make direct contact with the lower magnet 110 so that wear or damage of the supporting unit 100, which is caused by fatigue load, etc., can be minimized although use period of the supporting unit 100 increases.

As shown in FIGS. 1 and 2, the fixing part 130 is interposed between the lower magnet part 110 and the upper magnet part 120 in such a manner that the fixing part 130 can be assembled, thereby preventing the upper magnet part 120 from releasing from the upper position of the lower magnet 110. Also, the fixing part 130 has the upper fixing cap 131, the lower fixing cap 132, and a connecting part 133 connecting between the upper fixing cap 131 and the lower fixing cap 132. Although this connecting part 133 has a curved shape bulged out, it is a part which may be modified to be various shapes. The connecting part 133 is positioned between the upper fixing cap 131 and the lower fixing cap 132 so as to allow space between the upper magnet part 120 and the lower magnet part 110 to be exposed through a gap 130a. Although it is possible to install only one connecting part, it is preferably that connecting parts, which number more than one, are installed while having an interval between each other.

As shown in FIG. 2, the upper fixing cap 131 has an upper part and a lower part, which are opened so as to allow the upper magnet part 120 to ascend and descend, and includes an upper receiving part 131a receiving the upper casing 121 and the locking jaw 131b formed at an end of the upper part of the upper receiving part 131a in such a manner that the locking jaw 131b is positioned at an inner side of an opening 134 so as to prevent the upper magnet part 120 from releasing toward an upper direction due to repulsive force generated between the upper magnet part 120 and the lower magnet part 110. A portion of the upper magnet part 120 extends upwardly from an upper side of the fixing part 130 through the opening 134.

Accordingly, the buffer ring 123 assembled with each upper portion of the outer peripheral protuberance 121b is engaged with the locking jaw 131b so that it prevents the upper magnet 12 from being releasing and escaping from the upper side of the lower magnet part 110 due to repulsion generated between the upper magnet 122 and lower magnet 112.

Meanwhile, as shown in FIG. 3, it is preferable that each surface of the outer peripheral protuberance 121b, which makes contact with an inner surface of the upper receiving part 131a, has undergone a rounding process. Accordingly, contact area between the inner surface of the upper fixing cap 131 and the outer peripheral protuberances 121b can be minimized.

Figure 5:
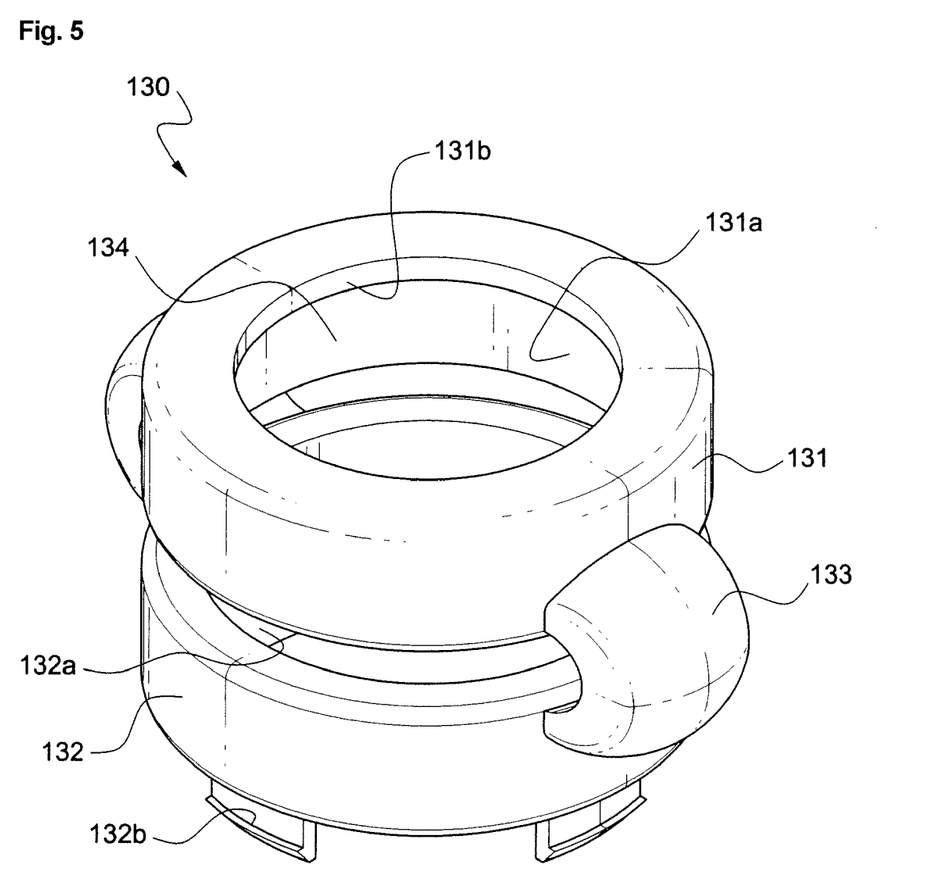
FIG. 5 is a perspective view of a fixing part shown in FIG. 2.

As shown in FIGS. 2 and 5, the lower fixing cap 132 corresponding to the upper fixing cap 131 is positioned at a lower part of the upper fixing cap 131, and includes a lower receiving part 132a receiving the lower casing 111 and at least one pair of locking parts 132b which has a hook-shape and is engaged with engaging parts 111b so as to allow the lower fixing cap 132 to be assembled with the lower magnet part 110.

According to one embodiment of the present invention, each locking part 132b is formed at the lower fixing cap 132, and each engaging part 111b, with which the locking part 132b is engaged is formed at the lower magnet part 110.

However, according to another embodiment of the present invention, each engaging part 111b may be formed at the lower fixing cap 132, and each locking part 132b may be formed at the lower magnet part 110.

Accordingly, the fixing part 130 is simply assembled with the lower magnet part 110 by means of a one-touch method, and the fixing part 130 prevents the upper magnet part 120 from escaping from the upper portion of the lower magnet part 110. Therefore, each component of the supporting unit 100 and the upper magnet 122 as well as the lower magnet 112 can be prevented from being lost.

Meanwhile, according to one embodiment, it is described that assembling between the fixing part 130 and the lower magnet part 110 is achieved by engaging method. However, according to another embodiment of the present invention, it can be also possible that assembling between the fixing part 130 and the lower magnet part 110 is achieved by various methods such as screw assembling, a fixedly inserting, a bolt assembling, etc. if they can be assembled with each other.

Accordingly, if there is a need to replace components including a magnet, it is always possible to disassemble the supporting unit 100 so as to easily replace it.

As shown in FIG. 5, each connecting part 133 is made from material having stiffness, and has one side assembled with the upper fixing cap 131 and the other side assembled with the lower fixing cap 132 in such a manner that some of space formed between the upper fixing cap 131 and the lower fixing cap 132 is exposed. According to one embodiment of the present invention, the material of the connecting part 133 is non-magnetic material and preferably includes Acrylonitrile Butadiene Styrene (ABS) copolymer having superior workability and impact resistance.

Accordingly, a state of an object being supported by levitation method is directly checked by the naked eye. Therefore, curiosity is generated due to visual effect, and it is easily checked when components including a magnet have to be properly replaced.

According to one embodiment of the present invention, it is preferable that the fixing part 130, which includes the upper fixing cap 131, the lower fixing cap 132, and connecting parts 133, is integrally formed by an injecting molding method, a die casting method, etc. Therefore, according to an embodiment, material of the fixing part 130 including the upper fixing cap 131, the lower fixing cap 132, and connecting parts 133 preferably includes ABS copolymer.

According to one embodiment of the present invention, it is described that the fixing part 130 is made from ABS copolymer. Meanwhile, according to another embodiment of the present invention, the fixing part 130 may be also formed by aluminum die casting method or copper-injecting molding method, i.e. by processing metallic material which have superior workability and non-magnetic property.

Figure 8:
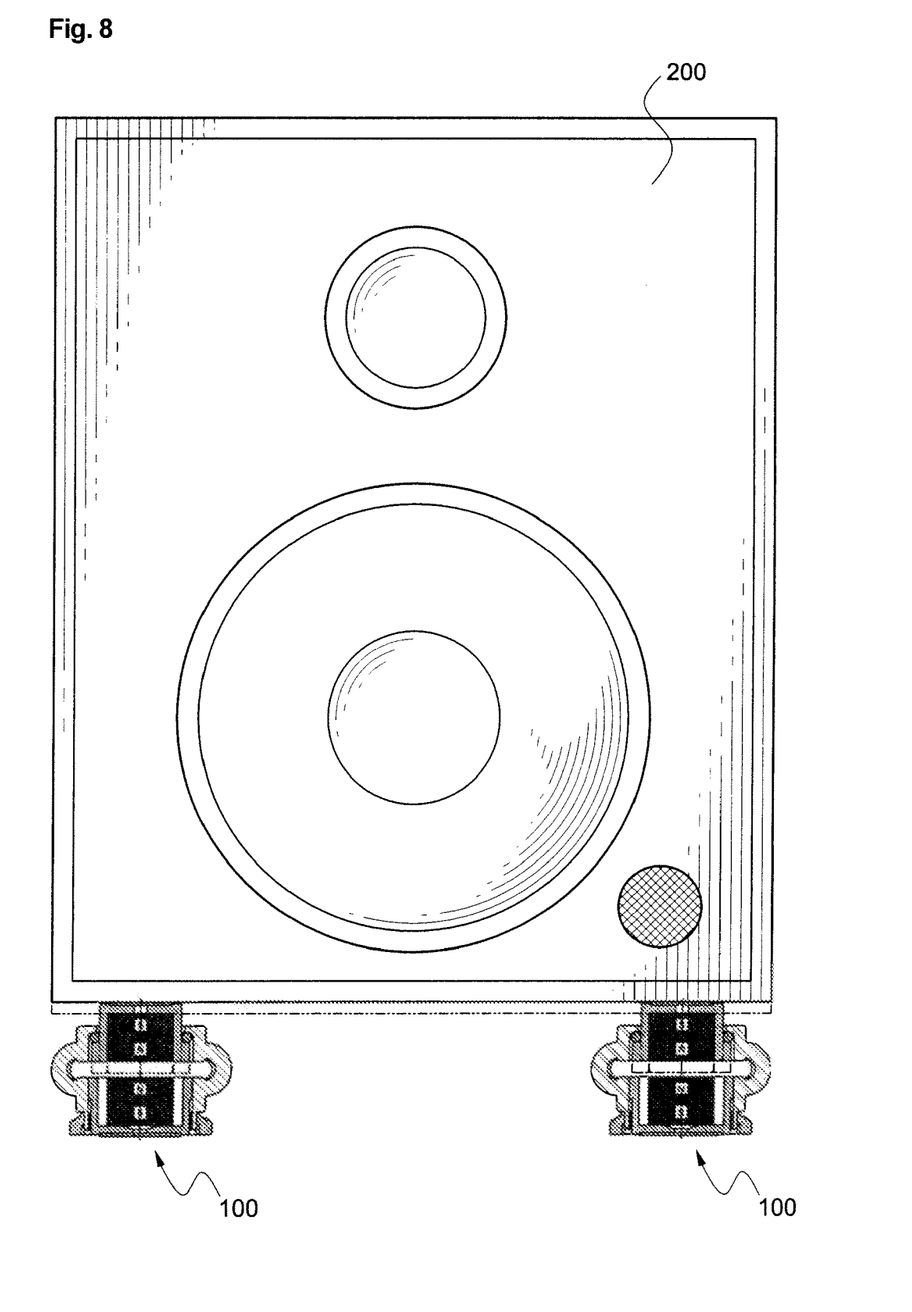
FIG. 8 is a view illustrating an embodiment employing the supporting unit shown in FIG. 6.

Accordingly, as shown in FIG. 8, the supporting unit 100 is interposed between the object 200 to be supported, such as a speaker, and an installing surface so that the supporting unit 100 can support the object 200 respective to the installing surface by a levitation method.

Figure 11:
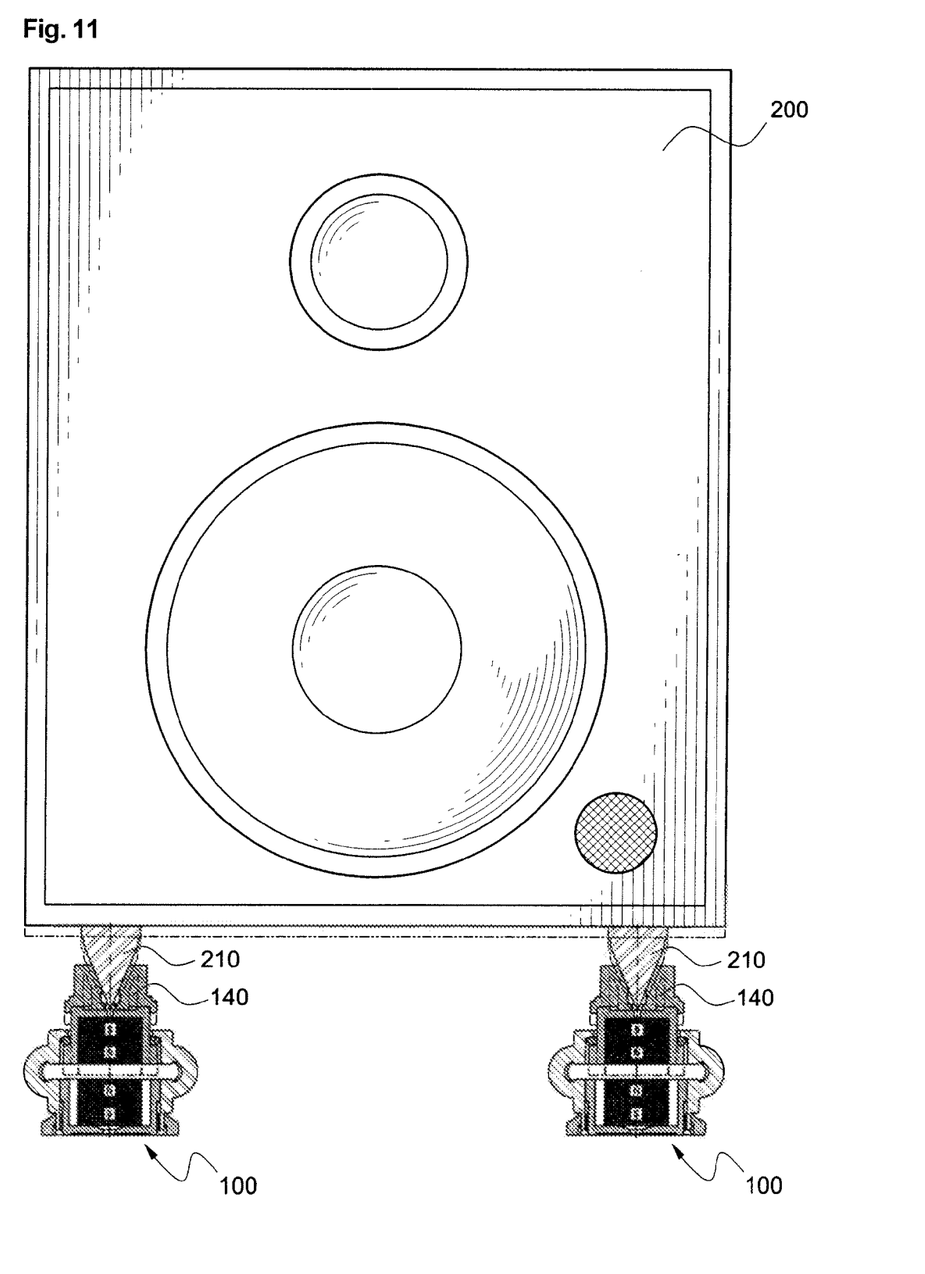
FIG. 11 is a view illustrating an embodiment employing the supporting unit of FIG. 9.

Meanwhile, according to another embodiment of the present invention, as shown in FIG. 11, if the object 200 to be supported is a speaker including a plurality of spikes 210 for preventing vibrations, the sub-support 140, which has one side having a shape corresponding to the shape of each spike so as to allow each spike 210 to be assembled with the one side, and the other side assembled with an upper part of the upper magnet part 120, may be further included.

Figure 9:
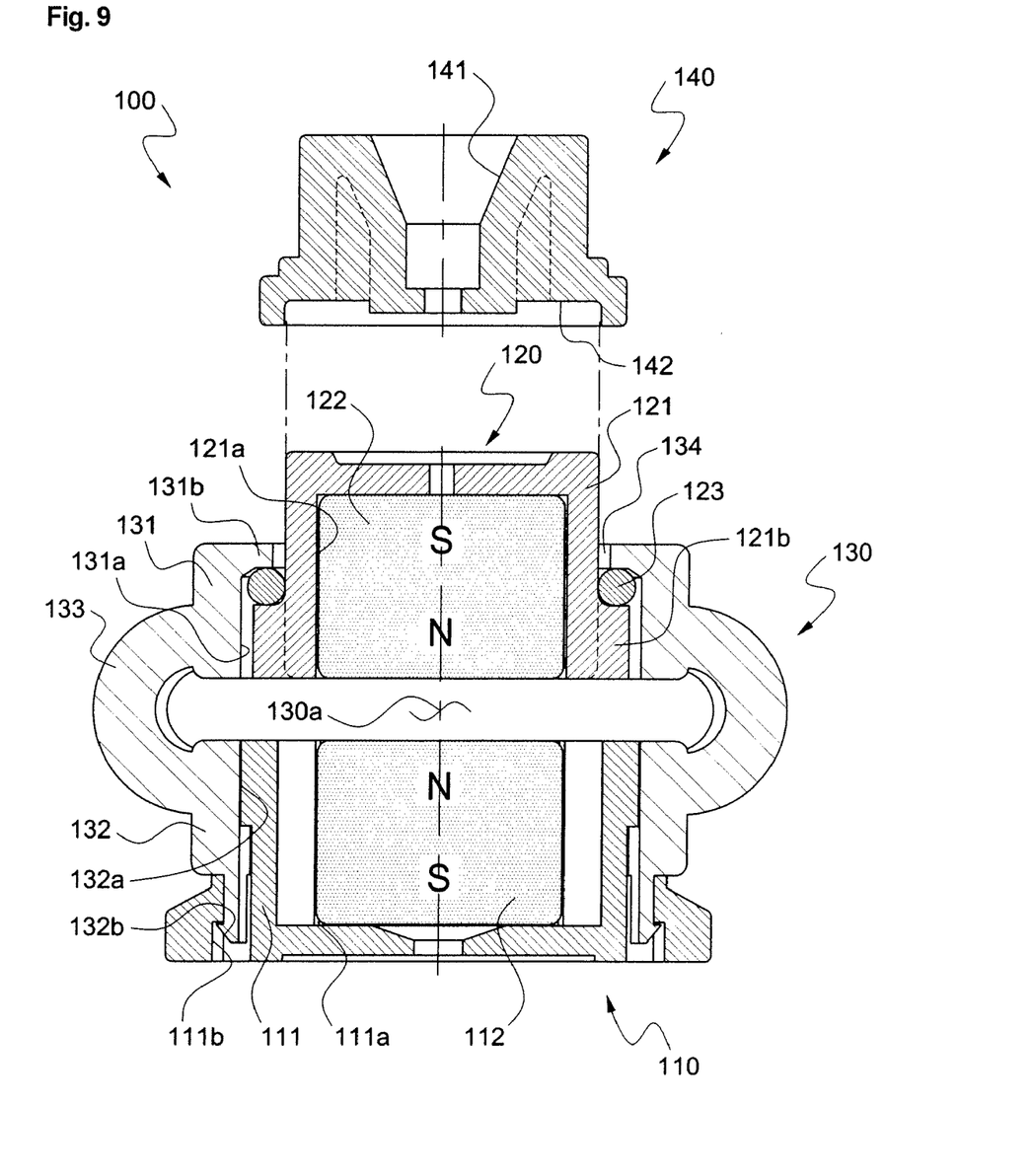
FIG. 9 is a view illustrating a supporting unit assembled with a sub-support according to another embodiment of the present invention.
Figure 10:
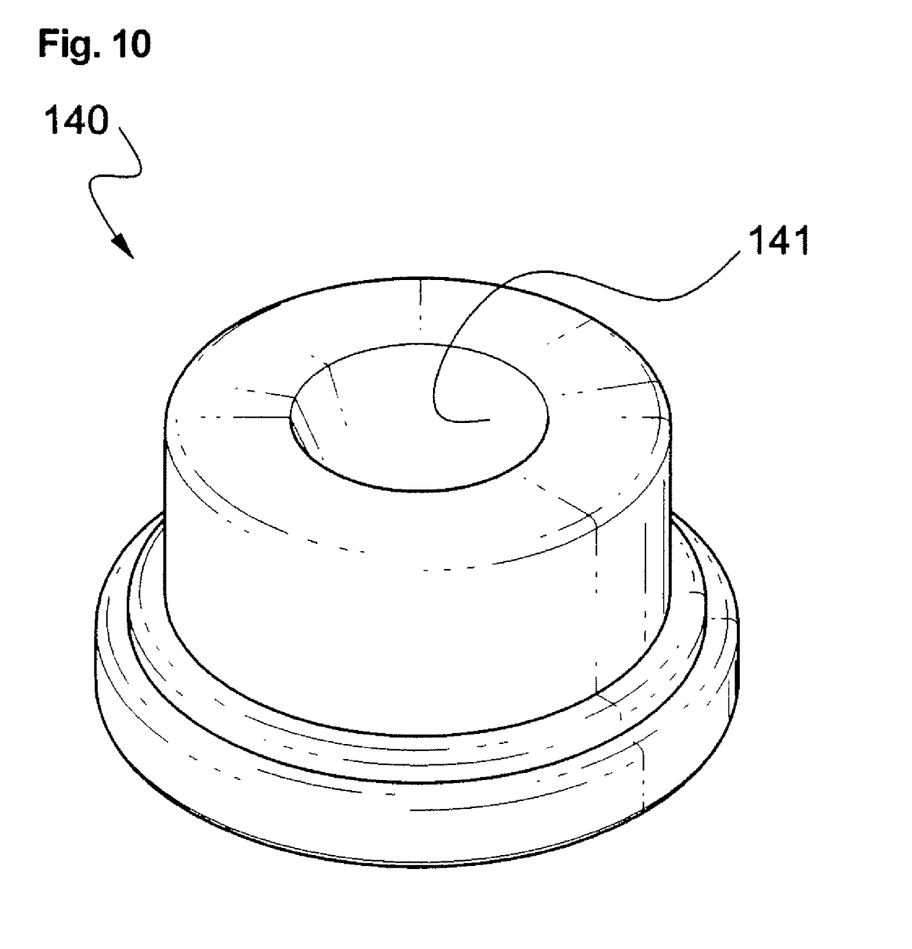
FIG. 10 is a perspective view of the sub-supporter of FIG. 9.

The sub-support 140, as shown in FIGS. 9 and 10, includes a spike assembling part 141, which has a recess-shape so as to allow the spike 210 of a conical shape to be inserted thereinto, formed at one side thereof, and a magnet assembling part 142, which has a recess-shape so as to allow the upper casing 121 of the upper magnet part 120 to be assembled, formed at the other side thereof.

Accordingly, when the object 200 having the spikes 210, such as a speaker, is supported, there is no need to disassemble the spikes 210 from the speaker, respectively, and in a state of the spikes 210 being assembled with the object 200, such as a speaker, the speaker can be supported by the supporting unit 100 in a simple manner.

According to one embodiment of the present invention, it is described that the object 200 to be supported is a speaker. Meanwhile, according to another embodiment of the present invention, in such a manner that supporting units having various numbers and various arrangement types may be employed, various kinds of objects 200, such as a refrigerator, an air conditioner, a washing machine, a piano, a sporting equipment such as a running machine, a TV, etc., can be supported by a levitation method.

Figure 12:
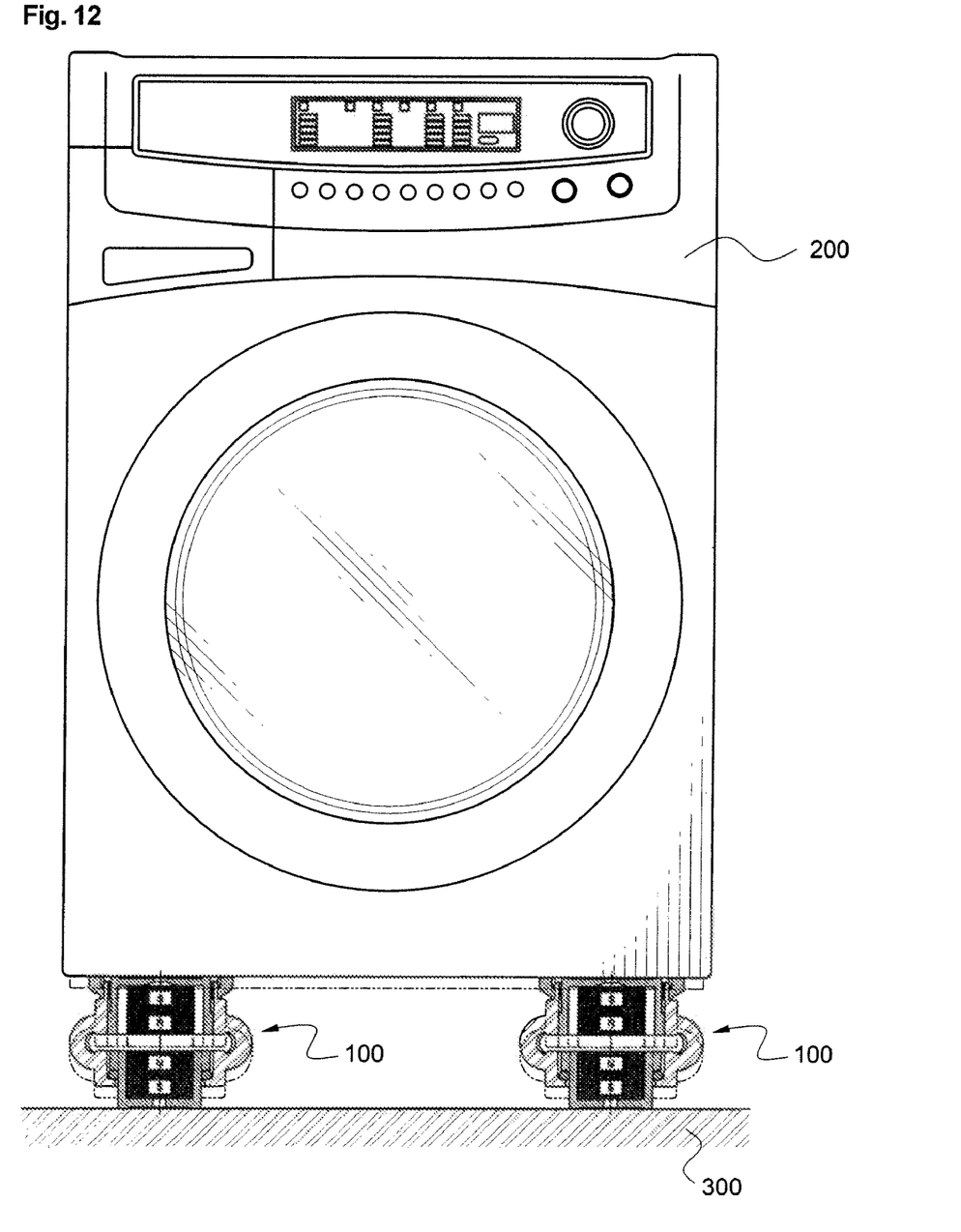
FIG. 12 is a view illustrating a reversed supporting unit integrally assembled with a supported object according to another embodiment of the present invention.

Meanwhile, according to another embodiment of the present invention, as shown in FIG. 12, the upper fixing cap 131 and the lower fixing cap 132 of the fixing part 130 are arranged in respective arrangement directions changed with each other. Therefore, the lower casing 111 of the lower magnet part 110 may be assembled with a lower surface of a washing machine which is the object 200 to be supported, and the upper casing 121 of the upper magnet part 120, which is elevatably assembled with the upper fixing cap 131, may make contact with an installing surface 300.

Also, the supporting unit 100 according to the present invention is integrally assembled with a lower part of the object 200 to be supported. Therefore, the supporting unit 100 may also be formed integrally with various objects 200 to be supported, such as a refrigerator, an air conditioner, a washing machine, a piano, sporting equipment such as a running machine, a TV, a speaker, etc.

According to such a structure, a process of assembling the levitation type supporting unit 100 according to an embodiment of the present invention will be described below with reference to FIGS. 1 to 5.

Firstly, the lower magnet 112 is assembled with the lower magnet receiving space 111a of the lower casing 111. Therefore, the lower magnet part 110 can be prepared.

Then, the upper magnet 122 is assembled with the upper magnet receiving space 121a of the upper casing 121, and the buffer ring 123 is assembled with each upper part of the outer peripheral protuberances 121b. Therefore, the upper magnet part 120 can be prepared.

The upper magnet part 120 is inserted into the fixing part 130 through a perforation opening of the lower receiving part 132a of the lower fixing cap 132 so that the upper magnet part 120 is pushed toward the upper receiving part 131a of the upper fixing cap 131.

Finally, the lower casing 111 of the lower magnet part 110 is inserted into the perforation opening of the lower receiving part 132a of the lower fixing cap 132 of the fixing part 130, and each locking part 132b of the lower fixing cap 132 is engaged with the corresponding engaging part 111b of the lower casing 111. Therefore, the magnet part 110 is assembled with the fixing part 130.

As such, according to the present invention, the supporting unit 100, which is interposed between the supported object 200 and the installing surface so as to support the object 200 respective to the installing surface by means of a levitation method, may be provided.

Figure 13:
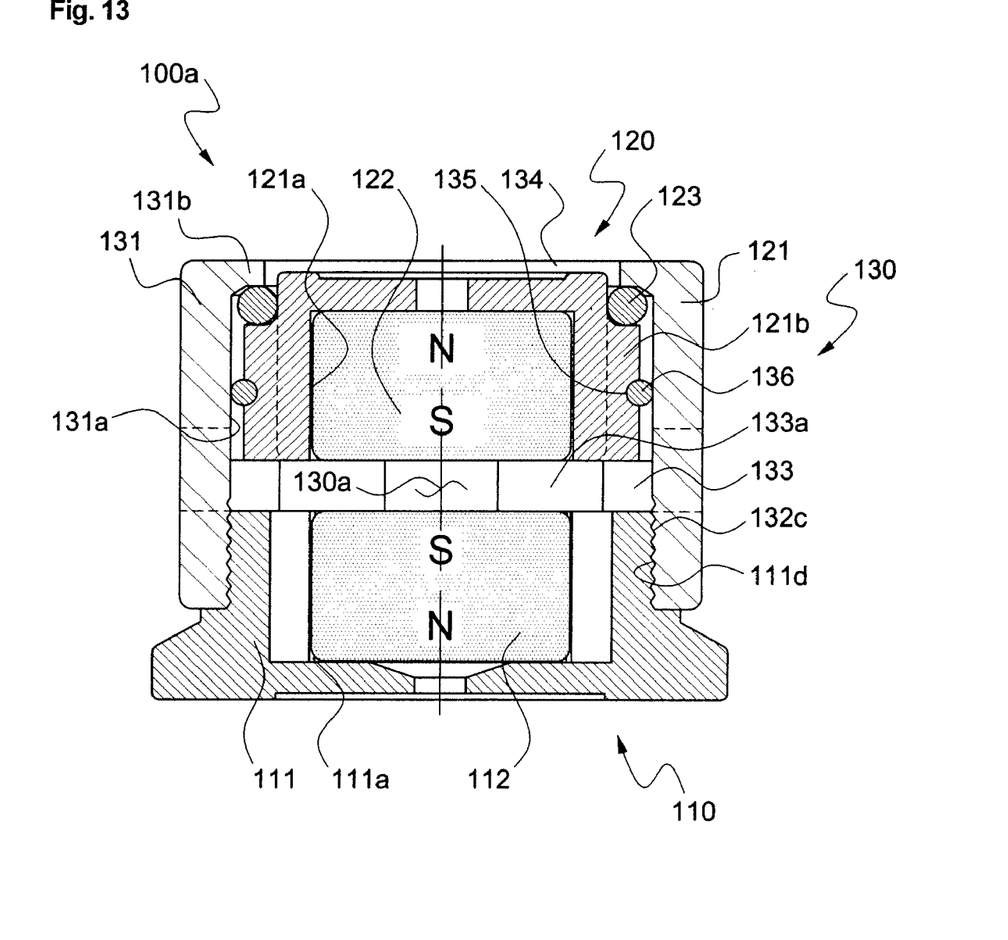
FIG. 13 is a sectional view of a modified embodiment of the supporting unit of FIG. 1.

As the case may be, as shown in FIG. 13, in the levitation type supporting unit 100a according to the present invention, the fixing part 130 has an opening 133a allowing an observer to check the interior between the upper fixing cap 131 and the lower fixing cap 132 so that it is also possible for a connection part 133 having a linear shape to be formed instead of the connecting part 133 bulged out as shown in FIG. 1. Also, different from the embodiment of FIG. 1, an outer circumferential surface of the lower casing 111 and an inner circumferential surface of the lower fixing cap 132 have threaded shapes 111d and 132c, respectively so as to be assembled with each other. Also, the upper magnet part 120 can be prevented from protruding toward an upper side of the fixing part 130 by the opening 134. Also, a ring groove 135 is formed at the outer circumferential surface of the upper casing 121 so as to allow a ring 136 having a sectional circle-shape to be inserted thereinto, or a protuberance having a sectional semi-circle-shape is directly formed at the outer circumferential surface of the upper casing 121. Therefore, the upper casing 121 can be prevented from moving leftward and rightward.

Remaining structures are the same described in FIGS. 1 to 12. Embodiments of the present invention have been described for illustrative purpose and not for limiting the scope the present invention. Modified supporting units, which are equivalent, are included in the present invention.

What is claimed is:

1. A levitation type supporting unit, which is interposed between an object to be supported and an installing surface so as to support the object respective to the installing surface, comprising:

a lower magnet part having a lower magnet;

an upper magnet part having an upper magnet, arranged at an upper part of the lower magnet part while having an interval in such a manner that the upper magnet part is spaced from the lower magnet part, the upper magnet has a surface facing the lower magnet, a polarity of the surface being equal to a polarity of a corresponding surface of the lower magnet; and a fixing part which includes an upper fixing cap being assembled with the upper magnet part so as to allow the upper magnet part to ascend and descend, a lower fixing cap which is spaced from the upper fixing cap and is assembled with the lower magnet part, and a connecting part formed between the upper fixing cap and the lower fixing cap, the connecting part connecting the upper fixing cap and the lower fixing cap in such a manner that a space formed between the lower magnet part and the upper magnet part is exposed, the fixing part preventing the upper magnet part from escaping from an upper position of the lower magnet part, wherein the lower magnet part includes a lower casing receiving the lower magnet, and the upper magnet part includes an upper casing receiving the upper magnet, and the upper fixing cap includes an upper receiving part receiving the upper casing, the upper receiving part having an opened upper side; a locking jaw being included at an upper part of the upper receiving part so as to prevent the upper magnet part from escaping toward an upper direction; and outer peripheral protuberances formed at an outer circumferential surface of the upper casing, the outer peripheral protuberances being locked with the locking jaw.

2. The levitation type supporting unit as claimed in claim 1, wherein material of the connecting part includes Acrylonitrile Butadiene Styrene (ABS) copolymer.

3. The levitation type supporting unit as claimed in claim 1, wherein a locking part is included at one of the lower fixing cap and the lower magnet part, and an engaging part, with which the locking part is engaged, is included at one of the lower magnet part and the lower fixing cap, which does not include the locking part.

4. The levitation type supporting unit as claimed in claim 3, being integrally installed at a lower part of the object to be supported.

5. The levitation type supporting unit as claimed in claim 1, wherein the outer periphery protuberances are arranged while radially protruding, and each surface of outer periphery protuberances, which makes contact with an inner surface of the upper receiving part, has undergone a rounding process.

6. The levitation type supporting unit as claimed in claim 1, wherein a buffer ring made from elastic material is installed between the outer periphery protuberances and the locking jaw.

7. The levitation type supporting unit as claimed in claim 6, being integrally installed at a lower part of the object to be supported.

8. The levitation type supporting unit as claimed in claim 1, wherein an inner surface of the lower casing has a radially protruding shape.

9. The levitation type supporting unit as claimed in claim 1, where the lower magnet part further includes a lower packing assembled with a lower part of the lower casing, and the upper magnet part further includes an upper packing assembled with an upper part of the upper casing.

10. The levitation type supporting unit as claimed in claim 1, further comprising a sub-support having one side having a shape corresponding to a shape of each spike so as to allow the corresponding spike to be assembled, and another end assembled with an upper portion of the upper magnet part when the supported object has a plurality of spikes for preventing vibrations, which are formed at a lower part of the supported object.

11. The levitation type supporting unit as claimed in claim 10, being integrally installed at a lower part of the object to be supported.

12. The levitation type supporting unit as claimed in claim 1, wherein a ring having a sectional circle-shape or a protuberance having a shape of a semi-circle is installed along an outer circumferential surface of the upper magnet part.

13. The levitation type supporting unit as claimed in claim 12, being integrally installed at a lower part of the object to be supported.

14. The levitation type supporting unit as claimed in claim 1, wherein the fixing part, the lower magnet part and the upper magnet part are reversed in up and down directions so that the upper magnet part assembled with the upper fixing cap is installed at the installing surface in such a manner that the upper magnet part makes contact with the installing surface.

15. The levitation type supporting unit as claimed in claim 14, being integrally installed at a lower part of the object to be supported.

16. The levitation type supporting unit as claimed in claim 1, being integrally installed at a lower part of the object to be supported.

* * * * *